UNITED STATES PATENT OFFICE.

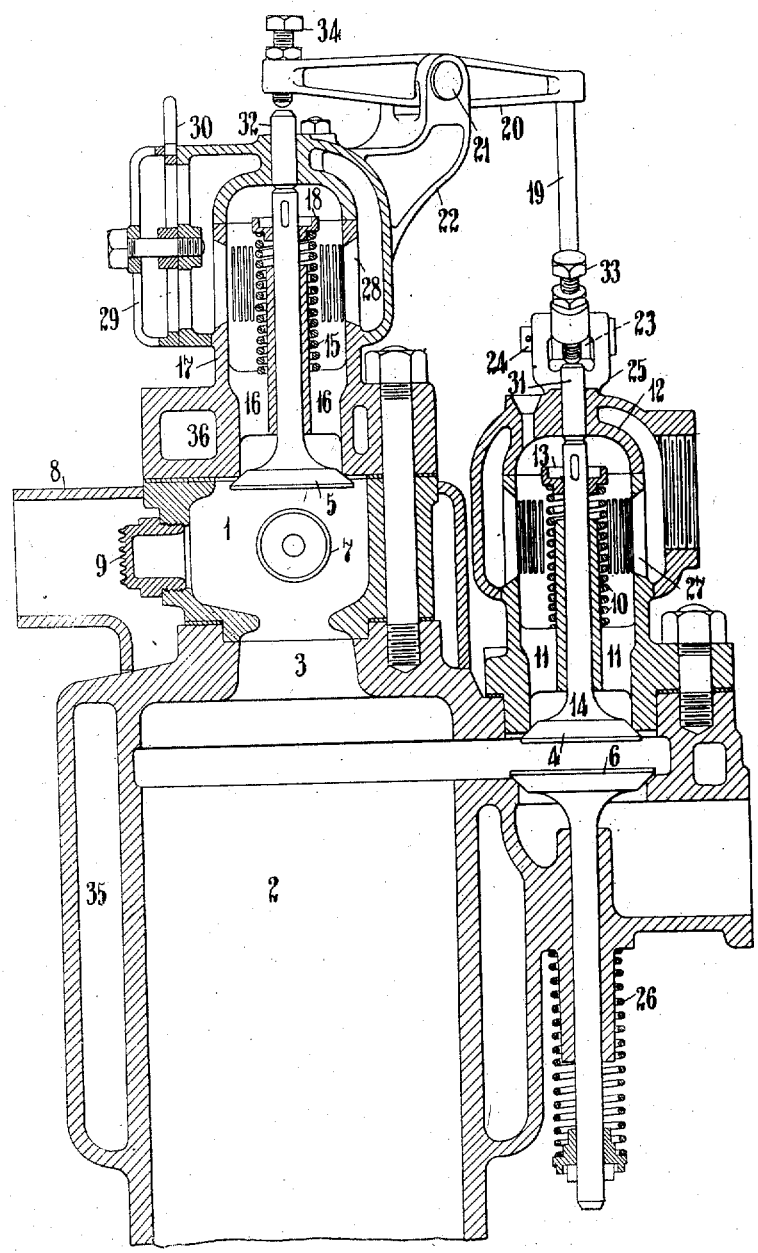

JAMES WILLIAM CROSS, OF LONDON, ENGLAND, ASSIGNOR TO THE WESTINGHOUSE BRAKE COMPANY, LIMITED, OF LONDON, ENGLAND.

OIL-ENGINE.

1,044,755.  Specification of Letters Patent.  Patented Nov. 19, 1912.

Application filed May 17, 1910. Serial No. 561,795.

*To all whom it may concern:*

Be it known that I, JAMES WILLIAM CROSS, a subject of the King of Great Britain, and resident of London, England, have made a new and useful Improvement in Oil-Engines, of which the following is a specification.

This invention relates to oil engines of the kind in which a hot combustion chamber is provided at the end of the cylinder and in which air only is drawn into the cylinder and compressed, whereupon liquid fuel is introduced into the combustion chamber where it vaporizes and is ignited. In engines of this class as heretofore constructed, the air is either drawn into the cylinder through the combustion chamber or between the combustion chamber and the piston in which case it does not pass through the combustion chamber. In the first case mentioned it is found that the combustion chamber may be cooled to such an extent by the rush of cold air through it as to interfere with the proper vaporization and ignition of the fuel. In the second case the products of combustion are liable to remain in the combustion chamber after the exhaust stroke, and as they are not swept out of the combustion chamber by the fresh air which is drawn into the cylinder, they accumulate and cause the combustion which takes place in the combustion chamber to be imperfect. As a result of this the cylinder is rendered foul and very often a smoky exhaust occurs.

According to the present invention, the above defects are obviated by arranging that a portion of the air drawn into the cylinder shall be passed through the combustion chamber, the remaining portion being drawn in between the piston and combustion chamber.

In order that the invention may be clearly understood the same will now be described with reference to the single figure of the accompanying drawing which is a view in side elevation partly sectional showing the upper portion of the cylinder of an engine with the valve and valve mechanism arranged in accordance with the invention.

The combustion chamber 1 of the engine is an extension of the main portion 2 of the cylinder and is in free communication therewith by means of a passage 3. The valve mechanism of the engine comprises an air inlet valve 4, an air inlet valve 5 arranged at the top of the combustion chamber 1 and an exhaust valve 6. Fuel is admitted to the combustion chamber through valve 7. A tube 8 attached to the combustion chamber is provided in which is located an ignition device 9 which is screwed into the wall of the said chamber and maintained at a temperature sufficient to cause the explosion of the mixture within the combustion chamber under the action of a gas flame or jet arranged within the tube or by other means. Under running conditions the repeated explosions within the combustion chamber will maintain this device at a sufficiently high temperature to effect the ignition of the gas mixture so that the ignition device 9 will only be required to operate at starting. The air valve 4 is normally held in its closed position by means of a spring 10 interposed between webs 11 attached to the wall of the casing 12 surrounding said valve and a collar 13 attached to the stem 14 of the valve. The valve 5 is similarly equipped and is normally held closed under the action of a spring 15 interposed between webs 16 attached to the casing 17 in which the valve is located and a collar 18 attached to the stem of the said valve. The valves 4 and 5 are operated by means of a cam actuated shaft 19 which is connected to one end of a lever 20 pivotally mounted at 21 upon a bracket 22 attached to the casing 17. The shaft 19 is also connected to one end of a lever 23 pivotally mounted at 24 upon a bracket 25 attached to the casing 12 surrounding the air inlet valve 4. The exhaust valve 6 is normally held in its closed position by means of a spring 26 and is operated in a well known manner preferably by means of a cam attached to the same shaft which effects the operation of the shaft 19. Air inlet ports 27 and 28 are provided for the air valve 4 and the air valve 5 respectively leading to the interior of the casing in which the valves are located. The admission of air to the interior of the casing 17 is controlled by a regulating device 29 which is opened or closed by means of a lever 30. The lever 30 may be arranged to be manually operated or may be under the control of the governor in such a manner as to automatically vary the amount of air admitted to the interior of the casing 17 in accordance with the speed of the engine. If desired, an additional air regulating valve may be provided in the passage leading to the interior of the casing 12 but under normal conditions adequate variation in the amount of air supplied to the engine will be obtained by varying the amount of air passing through the combustion chamber.

Bearing upon the stems of the valves 4 and 5 and projecting through the casing are two cylindrical members 31 and 32, the movement of the levers 23 and 20 being transmitted to the valves through these members by means of adjustable screws 33 and 34 arranged in the ends of the levers 23 and 20 respectively which may be adjusted by hand to vary the throw of the said valves. The cylinder of the engine is provided with the usual water jacket 35 and passages 36 located adjacent to those portions of the engine which are liable to become over-heated.

It will be understood that the air inlet valves 4 and 5 are operated simultaneously and as before explained, variation in the amount of air admitted to the cylinder may be obtained by varying the amount of air passing through the combustion chamber of the engine. It will be apparent that since air is admitted into the cylinder through the combustion chamber by means of the valve 5 as well as through the valve 4, the combustion chamber will be swept out on each suction stroke owing to the rush of air through it, but the combustion chamber will not be cooled to such an extent as would be the case if all the air were admitted to the cylinder in this manner. Any products of combustion which may remain in the combustion chamber after the scavenging stroke will be caused to follow the downward movement of the piston so that air only will be present in the combustion chamber and complete combustion of the fuel therein will be insured.

It will be understood that the invention is not limited to the construction of the valves herein described and illustrated, nor to any particular type of mechanism for effecting the operation of these valves and the invention can be applied to oil engines working on a two-stroke, four-stroke or other cycle, and having any desired number of cylinders, without exceeding the scope of the invention.

I claim as my invention:

1. In an oil engine the combination of a cylinder, a hot combustion chamber, an air inlet valve for supplying air to the combustion chamber, an air inlet valve for supplying air directly into the cylinder and positive means for simultaneously effecting the operation of the said valves.

2. In an oil engine the combination of a cylinder, a hot combustion chamber, a positively operated air inlet valve for supplying air to said chamber, a positively operated air inlet valve for supplying air directly into the cylinder between the piston and the combustion chamber and means for regulating the amount of air supplied to the combustion chamber.

In testimony whereof I have hereunto subscribed my name this twenty-eighth day of April 1910.

JAMES WILLIAM CROSS.

Witnesses:
A. A. BERGIN,
CHAS. J. FALCONER.

Copies of this patent may be obtained for five cents each, by addressing the "Commissioner of Patents, Washington, D. C."

---

Correction in Letters Patent No. 1,044,755.

It is hereby certified that in Letters Patent No. 1,044,755, granted November 19, 1912, upon the application of James William Cross, of London, England, for an improvement in "Oil-Engines," an error appears in the printed specification requiring correction as follows: Page 1, line 49, for the word "valve" read *valves;* and that the said Letters Patent should be read with this correction therein that the same may conform to the record of the case in the Patent Office.

Signed and sealed this 10th day of December, A. D., 1912.

[SEAL.]

C. C. BILLINGS,

*Acting Commissioner of Patents.* desired, an additional air regulating valve may be provided in the passage leading to the interior of the casing 12 but under normal conditions adequate variation in the amount of air supplied to the engine will be obtained by varying the amount of air passing through the combustion chamber.

Bearing upon the stems of the valves 4 and 5 and projecting through the casing are two cylindrical members 31 and 32, the movement of the levers 23 and 20 being transmitted to the valves through these members by means of adjustable screws 33 and 34 arranged in the ends of the levers 23 and 20 respectively which may be adjusted by hand to vary the throw of the said valves. The cylinder of the engine is provided with the usual water jacket 35 and passages 36 located adjacent to those portions of the engine which are liable to become over-heated.

It will be understood that the air inlet valves 4 and 5 are operated simultaneously and as before explained, variation in the amount of air admitted to the cylinder may be obtained by varying the amount of air passing through the combustion chamber of the engine. It will be apparent that since air is admitted into the cylinder through the combustion chamber by means of the valve 5 as well as through the valve 4, the combustion chamber will be swept out on each suction stroke owing to the rush of air through it, but the combustion chamber will not be cooled to such an extent as would be the case if all the air were admitted to the cylinder in this manner. Any products of combustion which may remain in the combustion chamber after the scavenging stroke will be caused to follow the downward movement of the piston so that air only will be present in the combustion chamber and complete combustion of the fuel therein will be insured.

It will be understood that the invention is not limited to the construction of the valves herein described and illustrated, nor to any particular type of mechanism for effecting the operation of these valves and the invention can be applied to oil engines working on a two-stroke, four-stroke or other cycle, and having any desired number of cylinders, without exceeding the scope of the invention.

I claim as my invention:

1. In an oil engine the combination of a cylinder, a hot combustion chamber, an air inlet valve for supplying air to the combustion chamber, an air inlet valve for supplying air directly into the cylinder and positive means for simultaneously effecting the operation of the said valves.

2. In an oil engine the combination of a cylinder, a hot combustion chamber, a positively operated air inlet valve for supplying air to said chamber, a positively operated air inlet valve for supplying air directly into the cylinder between the piston and the combustion chamber and means for regulating the amount of air supplied to the combustion chamber.

In testimony whereof I have hereunto subscribed my name this twenty-eighth day of April 1910.

JAMES WILLIAM CROSS.

Witnesses:
A. A. BERGIN,
CHAS. J. FALCONER.

Copies of this patent may be obtained for five cents each, by addressing the "Commissioner of Patents, Washington, D. C."

---

It is hereby certified that in Letters Patent No. 1,044,755, granted November 19, 1912, upon the application of James William Cross, of London, England, for an improvement in "Oil-Engines," an error appears in the printed specification requiring correction as follows: Page 1, line 49, for the word "valve" read *valves;* and that the said Letters Patent should be read with this correction therein that the same may conform to the record of the case in the Patent Office.

Signed and sealed this 10th day of December, A. D., 1912.

[SEAL.]

C. C. BILLINGS,

*Acting Commissioner of Patents.*

It is hereby certified that in Letters Patent No. 1,044,755, granted November 19, 1912, upon the application of James William Cross, of London, England, for an improvement in "Oil-Engines," an error appears in the printed specification requiring correction as follows: Page 1, line 49, for the word "valve" read *valves;* and that the said Letters Patent should be read with this correction therein that the same may conform to the record of the case in the Patent Office.

Signed and sealed this 10th day of December, A. D., 1912.

[SEAL.]

C. C. BILLINGS,

*Acting Commissioner of Patents.*